United States Patent
Baffert et al.

(10) Patent No.: US 6,306,328 B1
(45) Date of Patent: Oct. 23, 2001

(54) METHOD FOR MANUFACTURING A REMOTE-CONTROL DEVICE COMPRISING A CONTROL CABLE THAT CAN MOVE IN A SHEATH

(75) Inventors: Didier Baffert, Saint Quentin sur Isere; Nicolas Cosmides, Grenoble, both of (FR)

(73) Assignee: Societe Europeenne de Frabrications (FR)

( * ) Notice: Subject to any disclaimer, the term of this patent is extended or adjusted under 35 U.S.C. 154(b) by 0 days.

(21) Appl. No.: 09/363,114

(22) Filed: Jul. 29, 1999

(30) Foreign Application Priority Data

Jul. 29, 1998 (FR) .................................................. 98 09942

(51) Int. Cl.$^7$ ............................ B29C 45/14; B29C 45/32
(52) U.S. Cl. ......................... 264/242; 264/251; 264/263; 264/277
(58) Field of Search .................................... 264/251, 255, 264/275, 271.1, 242, 264, 263, 277, 254; 74/502.4, 502.5

(56) References Cited

U.S. PATENT DOCUMENTS

| 3,395,551 | * | 8/1968 | Morse . | |
| 3,416,398 | | 12/1968 | Conrad et al. . | |
| 3,994,185 | * | 11/1976 | Gilardi | 74/501 P |
| 4,304,149 | * | 12/1981 | Heimann | 74/501 R |
| 4,325,904 | * | 4/1982 | Frankhouse | 264/242 |
| 4,348,348 | * | 9/1982 | Bennett et al. | 264/255 |
| 4,373,113 | * | 2/1983 | Winkler et al. | 264/251 |
| 4,386,755 | | 6/1983 | Bennett et al. . | |
| 4,649,010 | * | 3/1987 | Bennett et al. | 264/242 |
| 4,786,454 | * | 11/1988 | Oddenino | 264/251 |
| 4,806,405 | * | 2/1989 | Liebl | 428/52 |
| 5,199,320 | * | 4/1993 | Spease et al. | 74/502.4 |
| 5,234,515 | * | 8/1993 | Sekkelsten | 156/49 |
| 5,613,405 | * | 3/1997 | Kelley et al. | 74/502.4 |
| 5,702,666 | * | 12/1997 | Hatakeyama et al. | 264/251 |
| 5,862,710 | * | 1/1999 | Koenig | 74/502.4 |
| 5,884,531 | * | 3/1999 | Koenig | 74/502.4 |

FOREIGN PATENT DOCUMENTS

| 20 32 959 | 1/1972 | (DE) . |
| 1 011 827 | 6/1952 | (FR) . |
| 1 394 383 | 2/1965 | (FR) . |

* cited by examiner

*Primary Examiner*—Angela Ortiz
(74) *Attorney, Agent, or Firm*—Cantor Colburn LLP

(57) ABSTRACT

The cable comprises a connecting means, such as an end termination, and the sheath comprises a retaining means, such as a ring.

The method comprises the operations consisting in:

placing the cable and the sheath in a mold which has two molding cavities which are shaped to allow the molding of said connecting means and said retaining means, these cavities being arranged given a distance apart that corresponds to a distance to be obtained between this connecting means and this retaining means; the positioning means allow either the sheath or the cable or both to be positioned with respect to each of the corresponding molding cavities, and closing the mold then molding the connecting means and the retaining means simultaneously.

5 Claims, 1 Drawing Sheet

METHOD FOR MANUFACTURING A REMOTE-CONTROL DEVICE COMPRISING A CONTROL CABLE THAT CAN MOVE IN A SHEATH

BACKGROUND OF THE INVENTION

The present invention relates to a method for manufacturing a remote control device comprising a control cable that can move in a sheath.

This device is particularly intended to equip a motor vehicle to allow the remote-control of a member of the engine of this vehicle or an item of apparatus that this vehicle comprises, for example the cabin heating or air-conditioning apparatus.

DESCRIPTION OF THE PRIOR ART

It is very commonplace to employ a device of this kind to achieve remote control. At least at one of its ends, the cable comprises a connecting means, such as an end termination, fixed to it, providing a connection between the cable and the control member or the controlled member, and the sheath comprises, near at least one of its ends, a retaining means, such as a ring, for immobilizing it in terms of translation and, as appropriate, mounting it on the apparatus, one member of which is controlled, or on the component supporting the control member.

The connecting means is often fastened by crimping a metal component onto the cable while the retaining means is fastened to the sheath either by welding, punching, force-fitting or bonding.

Precise control of a member by means of such a device entails precise control of the relative position of said connecting and retaining means when the cable and the sheath are in a precise relative position. With current methods, this precise control proves difficult to achieve, particularly when the items have to be mass-produced. Furthermore, the cost of a device of this kind is relatively high.

SUMMARY OF THE INVENTION

The present invention sets out to overcome these essential practical drawbacks.

To this end, the method to which it relates comprises operations consisting in:

placing the cable and the sheath in a mold comprising two molding cavities and at least one positioning means; one of the cavities is shaped to allow said connecting means to be molded over the cable and the other cavity is shaped to allow said retaining means to be molded over the sheath, these two cavities being arranged a given distance apart that which corresponds to a distance to be obtained between this connecting means and this retaining means; the positioning means allow either the sheath or the cable or both to be positioned with respect to each of the corresponding molding cavities;

positioning the cable or the sheath, in so far as one or the other of these has not already been positioned during the previous operation, appropriately with respect to the corresponding molding cavity, and closing the mold then molding the connecting means and the retaining means simultaneously.

The relative distance between these two means which has to be obtained is thus precisely determined by the relative distance between the mold cavities and by the positioning of the cable and of the sheath with respect to these cavities, and is so in the context of a manufacturing process that allows such devices to be mass-produced.

The connecting means and the retaining means are produced in the same molding operation, rather than in two successive operations as was the case in the prior art, which led to the introduction of inaccuracies into the relative position of these means and entailed a high cost price.

The invention also relates to the mold used for implementing this method and to the device obtained by this method.

BRIEF DESCRIPTION OF THE DRAWINGS

For a good understanding thereof, the invention is described again below with reference to the appended diagrammatic drawing which depicts, by way of non-limiting example, various stages in the implementation of the method to which it relates.

DESCRIPTION OF THE PREFERRED EMBODIMENTS

Figure 6:
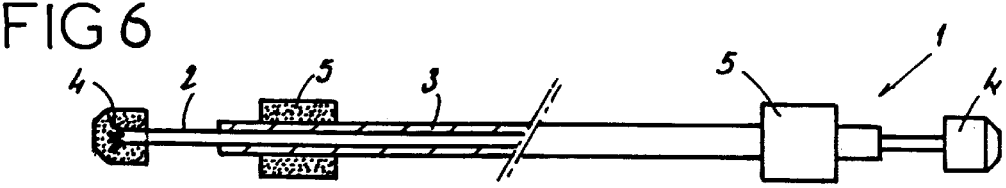
FIG. 6 is a view in part section of the finished device.

FIG. 6 depicts a remote-control device 1 which can, in particular, be used in a motor vehicle to control, for example, a member of an engine from a pedal or a member of an item of apparatus for heating or air-conditioning the cabin of the vehicle from a control knob or sliding control mounted on the instrument panel of this vehicle.

The device 1 comprises a control cable 2 engaged and capable of sliding in a sheath 3. The cable 2 comprises two end terminations 4 fixed to its ends, to allow it to be connected to the control member on the one hand and to the controlled member on the other hand. The sheath 3 comprises two rings 5 fixed to it, set back slightly from its ends, to allow each to be immobilized in terms of translation and possibly mounted, with respect to the controlled apparatus and to the component acting as a support for the control member.

Figure 1:
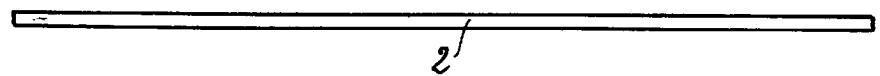
FIG. 1 is a simplified view of the cable that the device obtained by this method comprises.
Figure 2:
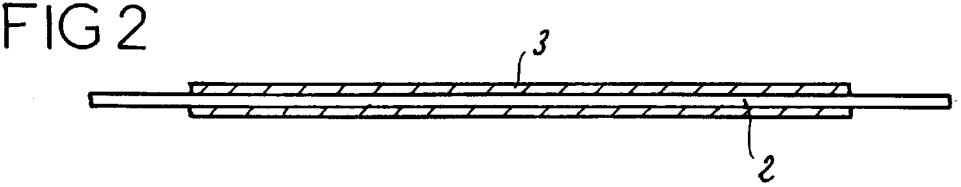
FIG. 2 is a view of this cable engaged in its receiving sheath, this sheath being depicted in longitudinal section.
Figure 3:
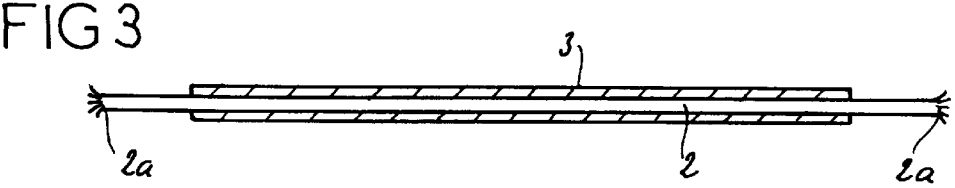
FIG. 3 is a view similar to FIG. 2, after the ends of the cable have been treated.
Figure 4:
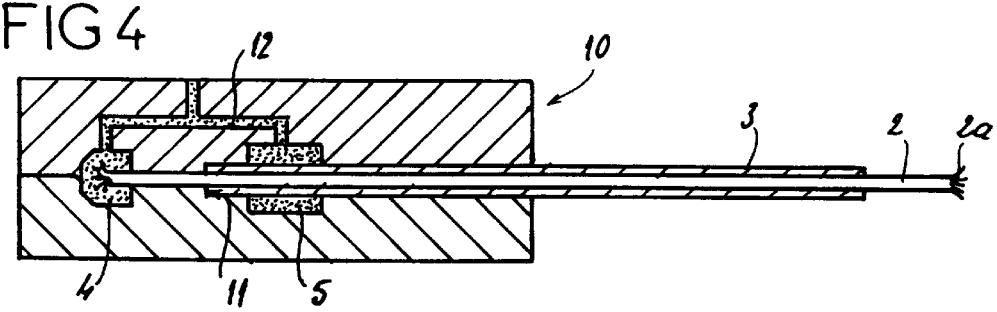
FIG. 4 is a view similar to FIG. 3 of this cable and of this sheath, during the operation of molding an end termination onto one of the ends of the cable and a ring onto the corresponding end of the sheath.
Figure 5:
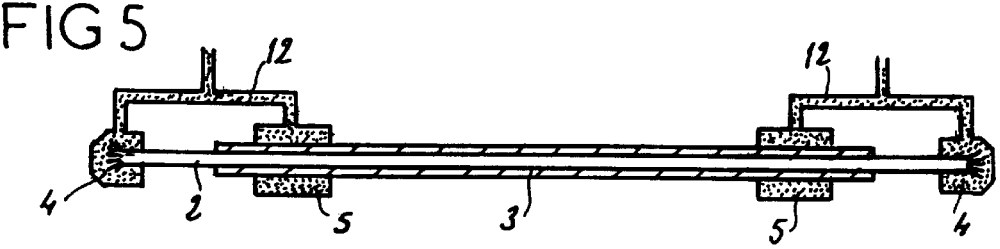
FIG. 5 is a view of the device similar to FIG. 4, after end terminations and rings have been molded onto both ends of the device.

The method of manufacturing the device 1 is explained with reference to FIGS. 1 to 5. It comprises the following various operations:

cutting an appropriate length of cable 2 (FIG. 1);

placing this cable in the corresponding sheath 3 (FIG. 2);

untwisting the metal filaments of which the cable 2 is made at the ends 2a of this cable, and parting these filaments, using the operation commonly known as "splaying" (FIG. 3);

placing one of the end parts of the sheath 3 and of the cable 2 in a two-part mold 10; as shown in FIG. 4, these two parts delimit a cavity which is shaped to allow the molding of an end termination 4 and a cavity which is shaped to allow the molding of a ring 5, and a bore capable of receiving the sheath 3 and a bore capable of receiving the cable 2; the bore capable of receiving the sheath 3 is delimited longitudinally by a transverse wall 11, which allows the sheath 3 to be positioned precisely with respect to the cavity intended for molding the ring 5;

positioning the cable 2 with respect to the sheath 3, by sliding this cable 2 in this sheath 3 so as to place the end of the cable 2 inside the cavity intended for molding the end termination 4;

closing the mold 10 and injecting thermoplastic into it (FIG. 4);

at the same time as or in sequence after these operations of placement in the mold 10 and of molding, repeating these same operations at the other end of the device 1, employing an appropriate mold, that is to say of a configuration that is symmetrical with that of the aforementioned mold 10;

releasing the device 1 from the mold after the thermoplastic has cooled (FIG. 5), and removing the sprue 12 resulting from the molding, so as to obtain the finished device 1 (FIG. 6).

The invention thus provides a method for manufacturing a control device 1 which makes it possible to overcome the drawbacks of the similar methods of the prior art, in that precise control over the relative position of the end termination 4 and of the ring 5, for a given position of the cable 2 with respect to the sheath 3 is achieved, at a low cost price and in the context of mass-production.

It goes without saying that the invention is not in any way restricted to the embodiment described above by way of example but that, on the contrary, it encompasses all alternative forms thereof. Thus, two end terminations 4 and two rings 5 could be molded in a single operation using a single mold, this mold containing two pairs of cavities like the aforementioned ones, formed in molding assemblies placed an appropriate distance apart.

What is claimed is:

1. A method for manufacturing a remote-control device comprising a control cable that can move in a sheath, the cable comprising, at least at one of its ends, a connector fixed to it for connecting the connector to a control member or a controlled member, the sheath comprising, proximate at least one of its ends, a retainer for immobilizing the sheath in terms of translation and, as appropriate, mounting the sheath on the device, one member of which is controlled, or on the component supporting the control member, the method comprising:

placing the cable and the sheath in a mold comprising two molding cavities and at least one positioning member, one of the cavities is shaped to allow the connector to be molded over the cable and the other cavity is shaped to allow the retainer to be molded over the sheath, these two cavities being arranged a given distance apart that corresponds to a distance to be obtained between the connector and the retainer, the positioning member allowing either the sheath or the cable or both to be positioned with respect to each of the corresponding molding cavities;

positioning the cable or the sheath, in so far as one or the other of these has not already been positioned, appropriately with respect to the corresponding molding cavity; and closing the mold and then molding the connector and the retainer simultaneously.

2. The method of claim 1, wherein the connector comprises an end termination.

3. The method of claim 1, wherein the retainer comprises a ring.

4. The method of claim 1, further comprising:

using a second molding assembly which is symmetrical with a first molding assembly and located a predetermined distance away from the latter, to mold a second connector and second retainer at another location of the cable and the sheath.

5. The method of claim 1, wherein the mold comprises a two-part mold, the two parts delimit a first cavity which is shaped to allow molding of the connector and a second cavity which is shaped to allow molding of the retainer, and a bore capable of receiving the sheath and a bore capable of receiving the cable, the bore capable of receiving the sheath is delimited longitudinally by a transverse wall which allows the sheath to be positioned precisely with respect to the second cavity intended for molding the retainer.

* * * * *